United States Patent [19]

Van Der Velden et al.

[11] Patent Number: 4,831,249

[45] Date of Patent: May 16, 1989

[54] X-RAY INTENSIFIER TUBE COMPRISING A SEPARATING LAYER BETWEEN THE LUMINESCENT LAYER AND THE PHOTOCATHODE

[75] Inventors: Johny W. Van Der Velden; Willem H. Diemer, both of Heerlen, Netherlands

[73] Assignee: U.S. Philips Corporation, New York, N.Y.

[21] Appl. No.: 109,800

[22] Filed: Oct. 16, 1987

[30] Foreign Application Priority Data

Oct. 21, 1986 [NL] Netherlands ........................ 8602629

[51] Int. Cl.$^4$ .......................... H01J 31/50; G01J 1/58

[52] U.S. Cl. .......................... 250/213 VT; 250/487.1; 313/527

[58] Field of Search ...... 250/213 VT, 487.1, 484.1 B, 250/492.2, 213 R; 313/527, 528, 543, 542

[56] References Cited

U.S. PATENT DOCUMENTS

| | | | |
|---|---|---|---|
| 3,716,714 | 2/1973 | Niewold et al. | 250/213 VT |
| 3,838,273 | 9/1974 | Cusano | 250/213 VT |
| 4,311,907 | 1/1982 | Takami et al. | 250/487.1 |
| 4,475,032 | 10/1984 | Popma et al. | 313/527 |
| 4,691,077 | 9/1987 | Gregory et al. | 250/492.2 |
| 4,712,011 | 12/1987 | Van Leunen | 250/487.1 |
| 4,717,631 | 1/1988 | Kaganowicz et al. | 313/619 |

*Primary Examiner*—David C. Nelms
*Assistant Examiner*—Michael Messinger
*Attorney, Agent, or Firm*—F. Brice Faller

[57] ABSTRACT

The separating layer between the luminescent layer and the photocathode of the entrance screen in an X-ray image intensifier tube is formed by a layer which has a suitable optical transmission, a suitable chemical inertia, a suitable tightness and a strongly bridging character and which is deposited by means of a plasma CVD technique, so that all requirements to be imposed on a separating layer can be satisfied without causing a substantial loss of efficiency. By variation of the material composition, measured across the thickness of the layer, an optimum optical transition can be realized between the luminescent layer and the photocathode.

7 Claims, 1 Drawing Sheet

X-RAY INTENSIFIER TUBE COMPRISING A SEPARATING LAYER BETWEEN THE LUMINESCENT LAYER AND THE PHOTOCATHODE

BACKGROUND OF THE INVENTION

The invention relates to an X-ray image intensifier tube, comprising an entrance screen which includes a layer of luminescent material, a photocathode and a separating layer which is provided therebetween, and also comprising an electron-optical system images an electron beam, released from the photocathode onto an exit screen.

An X-ray image intensifier tube of this kind is known from GB No. 1,507,370. Therein it is noted that a separating layer must form a chemical barrier between the luminescent layer and the photocathode, which barrier must prevent mutual contamination and must not constitute a substantial barrier for the luminescent layer; moreover, the resolution of the screen may not be substantially reduced thereby.

The solution disclosed therein, utilizing a multiple layer, has several drawbacks. First of all, as appears from the information given, the layer must be thin in order to achieve adequate transmission for the luminescent light. In this context thin is to be understood to mean a thickness which does not exceed the wavelength of the luminescent light. As a result, the function of chemical barrier is liable to be affected and severe requirements must be imposed as regards the deposition technique for the layer which, due to its multiple nature, is already comparatively complex for the known separating layers.

As is stated in U.S. Pat. No. 3,838,273, it is also desirable that the photocathode has a comparatively low electrical resistance in conjunction with a separating layer. In high-resolution X-ray image intensifier tubes, as described in U.S. Pat. No. 3,838,763, this requirement is substantially more severe, because the electrical conductivity of the luminescent layer is liable to be reduced by the columnar structure of the layer, very desirable for reasons of resolution, and the homogeneity of the separating layer and the photocathode may be disturbed thereby. Layers having an adequate electrical conductivity often fail to saitsfy the other requirements, for example in that they must be constructed so as to be too thick for adequate optical transmission.

SUMMARY OF THE INVENTION

According to the invention the separating layer consists of a layer of material which is deposited on the luminescent layer by means of a plasma CVD technique and which smoothes the surface of the luminescent layer.

Because very dense layers of material having pronounced bridging properties can be formed by means of plasma CVD techniques at temperatures which do not affect the screen and because suitable electrical conductivity as well as suitable optical transmission can be achieved by these layers by an appropriate choice of materials, these layers will satisfy all requirements imposed. The optical transmission of layers thus formed from, for example nitrides, carbonides, borides and silicides, can easily reach a value of more than 90% for layers having a thickness of upto some tens of μm. Because extremely dense, suitably bridging layers are formed, a suitably tight barrier is ensured between the luminescent layer and the photocathode and also an extremely attractive substrate for the photocathode is obtained, so that electrical charging phenomena across the photocathode are avoided. The separating layer in a preferred embodiment consists of a nitride, notably a mixture of nitrides. It is known that nitrides are extremely inert for chemical influencing, even at the present comparatively high temperatures, and notably are not affected by the materials, for example Cs, used for forming the photocathodes. Particularly attractive materials are, for example TiN, ZrN and HfN which have a suitable optical transmission. Favourable results have been obtained by using $Si_2N_3$ and mixtures of $Si_2N_3$ and Si oxide, on the one hand because of the attractive deposition properties and their high resistance on the other hand.

By the choice of successive materials in the separating layer, optimum optical matching can be achieved between, for example a CsI luminescent layer having a refractive index of approximately 1.8 and the photocathode layer having a refractive index of, for example approximately 3. A layer which is composed of discrete sublayers of different materials as well as a continuously changing layer is feasible. Notably for the latter layer the deposition in accordance with the invention does not impose problems, because the various materials or elements of a composite material can be deposited in a varying ratio in the plasma space. For example, use can be made of oxynitrides in continuously or discretely varying ratios, Thus, there can be formed particularly attractive layers which have, for example a ratio of $Si_3N_4$ (refractive index 3) and $SiO_2$ (refractive index 1.5) which varies across the layer thickness. See also Journal Electr. Chem. Soc., December 1983, pages 2419–2473.

Even though the attractive intrinsic optical transmission of preferred separating layers in accordance with the invention eliminates the previously applicable substantial restriction as regards the thickness, the strongly smoothing nature and the high density and homogeneity thereof still enable the use of thin layers, without giving rise to detrimental charging phenomena. The separating layer in a preferred embodiment is formed by a layer having athickness of at the most approximately 0.4 μm which is composed of a material having a pronounced bridging character and a high density, for exampale MoSi. From the comparatively large group of materials which can be deposited by means of CVD techniques, materials can be readily chosen which exhibit a comparatively low vapour pressure for the circumstances and temperatures occurring in the tube and which melt or decompose only at very high temperatures, for example in excess of 1500° C.

In a further preferred embodiment, the screen comprises a luminescent layer which has a pronounced structure and which is sealed by a strongly bridging separating layer so that it is smoothed for the deposition of a photocathode layer. To this end, a final layer of the luminescent layer can also be deposited at the side of the photocathode by CVD techniques. Thus, using the luminescent material itself, notably CsI, a suitably tight, suitably conductive substrate can be realized which is also suitable for a possible further layer and ultimately for the photocathode. The restrictions imposed as regards the composition and/or thickness of the photocathode in order to prevent charging phenomena are thus cancelled.

BRIEF DESCRIPTION OF THE DRAWING

The sole Figure is a section view of the X-ray image intensifier tube according to the invention.

DETAILED DESCRIPTION OF THE PREFERRED EMBODIMENT

Figure 1:
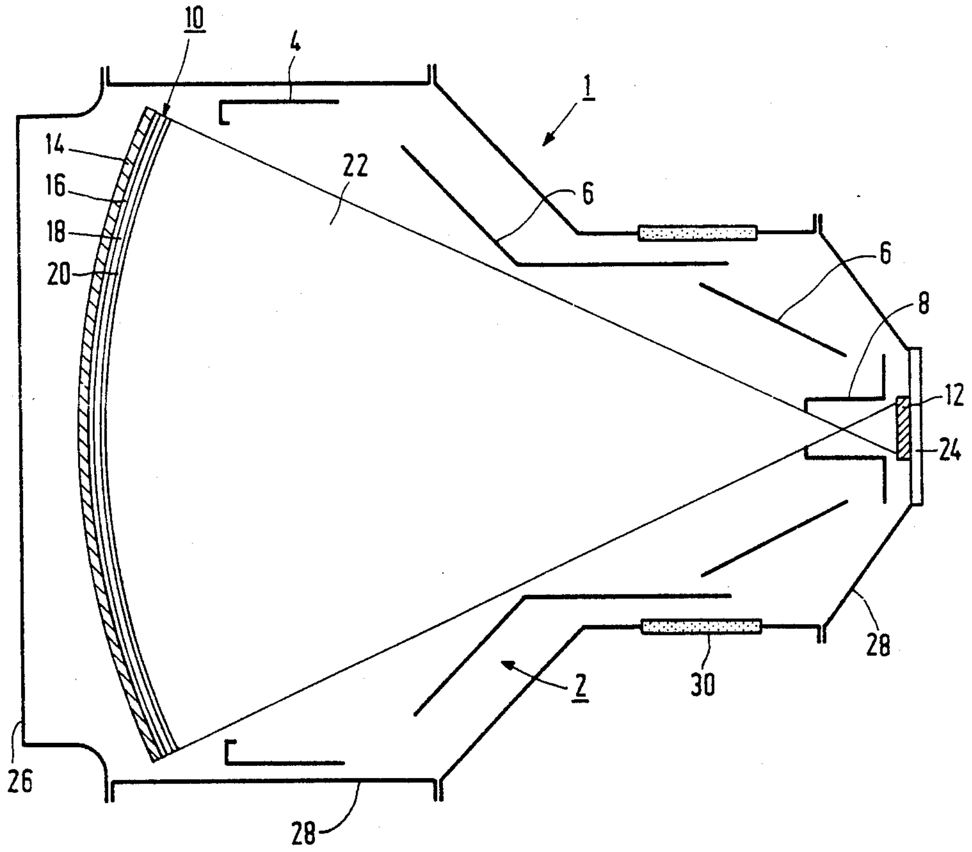

Referring to the sole Figure, the X-ray image intensifier tube 1 has an electron-optical system 2 which comprises a shielding electrode 4, a focussing electrode 6 and an anode 8. The tube also has an entrance screen 10 and an exit screen 12. The entrance screen 10 of the present embodiment 12. The entrance screen has a carrier 14, a luminescent layer 16, a separating layer 18 and a photocathode 20. Using the electron-optical system 2, an image-carrying electron beam 2 emerging from the photocathode 20 is imaged on the exit screen 12. In the exit screen a luminescent image is formed which can be studied, photographed, converted into a video signal etc. via an exit window 24. The tube envelope not only includes the exit window 24, but also a preferably metal entrance window 26, metal jacket portions 28 and an insulating ring 30. The entrance screen is included in the tube as a separate element in the present embodiment, but may also be provided directly on the entrance window. In practical embodiments the carrier 14 is formed, for example by a titanium foil having a thickness of 250 μm, the luminescent layer 16 being a layer of CsI having a thickness of approximately 300 μm, and the photocathode being an S9 or S20 photocathode having a customary thickness of approximately 0.01 μm. The separating layer 18 serves to prevent mutual contamination of the luminescent layer and the photocathode, to form a suitably defined supporting surface for the thin photocathode, and to prevent electrical charging phenomena in the photocathode. It is desirable that the separating layer 18 forms an as slight as possible otical barrier for the luminescent layer 16 which is directed towards the photocathode 20 and which is generated in the luminescent layer 16 by incident X-rays. In addition to material properties such as chemical inertia, suitable optical transmission and a high impermeability for contaminating substances such as Cs from the photocathode 20, the structure of the separating layer 18 is also important in this respect. In addition to a widely increased choice of materials, plasma CVD techniqus offer layers having a strong bridging character. The thickness of the layer can also be varied to a high degree, so that it can be adapted so as to be optimum for the requirements imposed. Because the material can be supplied from the outside during deposition, the composition can be readily varied during deposition. As a result, the local requirements can always be optimally satisfied, for example, a structured phosphor layer can be formed with first a layer having a strongly bridging character, followed by adaptation to a desired variation of the refractive index of the layer for optmum optical transmission of the luminescent light. It is also possible to make a choice between a thin layer, for example having a maximum thickness of 0.5 μm but still sufficient tightness, bridging and electrical conductivity, and a thicker layer, for example, a thickness exceeding 10 μm, for which suitable optical transmission is still ensured. A device for performing plasma CVD techniques is described in Journ. Electrochem. Soc., April 1985, pp 893–898. Screens comprising, for example a vapour-deposited CsI layer can be provided, preferably on the grounded electrode, with a separating layer in a device of this kind. To this end, the device essentially need only be provided with a sufficiently large entrance. As indicated, from different containers a gas mixture of any composition can be applied and deposited, hence also activated CsI for a dense top layer.

What is claimed is:

1. An X-ray image intensifier tube (1), comprising an entrance screen (10) which includes a layer of luminescent material (16), a photocathode (20) and a separating layer (18) which is provided therebetween, and also comprising an electron-optical system (2) for imaging an electron beam (22), to be released from the photocathode, onto an exit screen (12), characterized in that the separating layer consists mainly of TiN, ZrN, HfN or a mixture thereof which is deposited on the luminescent layer by means of a plasma CVD technique and which smoothes the surface of the luminescent layer.

2. An X-ray image intensifier tube as claimed in claim 1, characterized in that the separating layer is formed by a layer of material having a high transmission for the luminescent light and a thickness of at least a few μm.

3. An X-ray image intensifier tube as claimed in claim 2, characterized in that the separating layer has a varying refractive index, measured in the thickness direction.

4. An X-ray image intensifier tube as claimed in claim 3, characterized in that the refractive index of the separating layer increases from approximately 1.8 to approximately 3.0 in the direction from the luminescent layer towards the photocathode.

5. An X-ray image intensifier tube as claim 1, characterized in that the separating layer consists of a material having a vapour pressure which is negligibly low for the tube temperatures which occur during later operations on or operation of the tube.

6. An X-ray image intensifier tube as claim 1, characterized in that the luminescent layer has a structure of optically separated columns which are bridged by the separating layer and which have a transverse dimension of at the most approximately 10 μm.

7. An X-ray image intensifier tube as claim 1, characterized in that the separating layer consists at least partly of a top layer of luminescent material deposited by means of the plasma CVD technique.

* * * * *